(12) United States Patent
Aoki et al.

(10) Patent No.: US 7,606,761 B2
(45) Date of Patent: *Oct. 20, 2009

(54) DATA OUTPUT CONTROL APPARATUS

(75) Inventors: Mikio Aoki, Suwa (JP); Shinya Taniguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 918 days.

This patent is subject to a terminal disclaimer.

(21) Appl. No.: 11/047,605

(22) Filed: Feb. 2, 2005

(65) Prior Publication Data

US 2005/0131819 A1 Jun. 16, 2005

Related U.S. Application Data

(63) Continuation of application No. 09/892,887, filed on Jun. 28, 2001, now Pat. No. 7,379,914, which is a continuation of application No. PCT/JP00/07718, filed on Nov. 1, 2000.

(30) Foreign Application Priority Data

Nov. 1, 1999 (JP) ................................. 11-311599

(51) Int. Cl.
 *G06Q 40/00* (2006.01)
(52) U.S. Cl. .............................. 705/39; 705/35; 455/39; 455/68; 455/69
(58) Field of Classification Search ............. 705/35–45; 455/68–69

See application file for complete search history.

(56) References Cited

U.S. PATENT DOCUMENTS

| 5,490,287 A | 2/1996 | Itoh et al. |
| 5,797,067 A | 8/1998 | Mitekura |

FOREIGN PATENT DOCUMENTS

| EP | 0 856 972 A2 | 8/1998 |
| JP | A-10-191453 | 7/1998 |
| JP | A-10-269390 | 10/1998 |
| JP | A-10-326165 | 12/1998 |
| JP | A-11-103291 | 4/1999 |
| JP | A-11-146118 | 5/1999 |
| JP | A-11-154218 | 6/1999 |
| JP | A-11-249847 | 9/1999 |
| WO | WO 92/15168 | 9/1992 |
| WO | WO 99/00968 | 1/1999 |

OTHER PUBLICATIONS

Bonnema, A Wireless Revolution, Appliance, 2002.

*Primary Examiner*—Richard C Weisberger
(74) *Attorney, Agent, or Firm*—Oliff & Berridge, PLC

(57) ABSTRACT

The invention provides a data output control apparatus which allows detailed information on a network to be readily obtained, which is advantageous with respect to cost, and which is suitable for specifically notifying the user of the service charge. A data output control terminal is communicatively connected via the Internet to a portable terminal carried by a user, printing apparatuses provided at various locations, and WWW servers. The data output control terminal obtains from a WWW server data associated with a data print request from the portable terminal, selects one of the plurality of printing apparatuses, and outputs the obtained data to the selected printing apparatus. Billing is executed in accordance with the result of use by the portable terminal of the print service provided by the data output control terminal. The billing is executed by summing the service charge and the call charge of the portable terminal.

14 Claims, 8 Drawing Sheets

DATA OUTPUT CONTROL APPARATUS

This is a Continuation of application Ser. No. 09/892,887 filed Jun. 28, 2001, which in turn is a Continuation, which claims the benefit of Application No. PCT/JP00/07718 filed Nov. 1, 2000. The entire disclosure of the prior applications is hereby incorporated by reference herein.

BACKGROUND OF THE INVENTION

1. Field of Invention

The present invention relates to an apparatus, and a method therefor, which is communicatively connected, via a network, to a portable terminal carried by a user, and to a plurality of printing apparatuses provided at various locations, and which outputs, in response to a data print request from the portable terminal, data associated with the data print request to one of the printing apparatuses. More specifically, the invention relates to a data output control apparatus which allows detailed information on a network to be readily obtained, which is advantageous with respect to cost, and which is suitable for specifically notifying the user of the service charge.

2. Description of Related Art

In recent years, information on the Internet is readily available anywhere using, for example, i-mode™ provided by NTT Mobile Communications Network, Inc. (NTT DoCoMo).

However, although such a portable terminal allows information on the Internet to be readily obtained anywhere, because the structure of display is simplified for purposes, such as reducing the size of, and saving energy for, the portable terminal, the displayed information is rather simplified compared with a display on an ordinary personal computer. Thus, a user is not satisfied with the information service.

Accordingly, in order to provide detailed information while continuing to reduce the size of, and save energy for, the portable terminal, an arrangement can be provided in which, by combining a portable terminal and a printing apparatus, rough information is displayed on the portable terminal, while detailed information is printed by the printing apparatus. However, this arrangement of combining the portable terminal and printing apparatus faces several technical problems which must be solved.

For example, since the printing apparatus is large in size and is difficult for a user to carry with the portable terminal, in order to print the detailed information, ordinarily, a printing apparatus that is provided at a home or at an office will be used. However, use of a fixed, particular printing apparatus would hardly allow information to be readily obtained anywhere. In order to achieve this, it is required that either the size of the printing apparatus be reduced to such an extent as to allow it to be carried, or that an arbitrary printing apparatus be allowed to be used. The former is not feasible because it is technically very difficult to achieve with presently available technology. The latter is not feasible either because each printing apparatus requires a unique driver, thus requiring that the portable terminal be embedded with drivers for each of the printing apparatuses to be used.

Furthermore, for example, when such a print service is provided, the service provider needs to receive, from the user, the service charge as the price of the print service. In this case, when the user prints data using a printing apparatus and receives the printed material, for example, it may be such that the user pays the service charge in accordance with the number of prints. However, when the number of prints is large, manual counting would take energy and time, and also tend to cause miscounts. In case of a miscount, it is impossible to specifically notify the user of the service charge. Meanwhile, in an arrangement in which counters which count the number of prints is provided in printing apparatuses in order to count the number of prints, each of the printing apparatuses needs to be provided with a counter, incurring an increased cost. Furthermore, in accordance with such a payment method, in order to receive the printed materials, the user needs to carry enough money to pay the service charge; if the user does not carry enough money, the user is not allowed to receive the printed materials, which does not allow information to be readily obtained anywhere.

SUMMARY OF THE INVENTION

Accordingly, the present invention has been made in view of the problems yet to be solved by the conventional art, and an object thereof is to provide a data output control apparatus which allows detailed information on a network to be readily obtained, which is advantageous with respect to cost, and which is suitable for specifically notifying the user of the service charge.

In order to achieve the above object, a data output control apparatus according to the present invention is provided, wherein detailed information on a network can be readily obtained compared with before. In particular, the service charge as the price of the print service can be specifically calculated, and the service charge need not be calculated each time the print service is used. Furthermore, compared with the arrangement in which counters which count the number of prints are provided in output terminals in order to count the number of prints, each of the output terminals need not be provided with a counter, serving to reduce the cost of settling the service charge. Furthermore, even if the user does not carry enough money, the user is allowed to receive the service of output data. Thus, the user is allowed to receive the output data more easily, being allowed to readily obtain detailed information on a network and to pay the service charge with ease. The service provider receives benefits with respect to cost, with collection of the service charge easier and more secure and the procedure of settling the service charge facilitated. In addition, the service provider is allowed to specifically notify the user of the service charge, receiving an advantage that an information service with an adequate satisfaction can be provided.

Furthermore, in accordance with the data output control apparatus according to another aspect of the present invention, the print service is provided only to legitimate users of the print service provided by the apparatus; thus, illegitimate use by illegitimate users of the print service provided by the apparatus is inhibited. The service provider is allowed to bill the service charge to a specific person, collection of the service charge thus being easier and more secure, and the procedure of settling the service charge being facilitated. Accordingly, the service provider also receives the advantage that an even more satisfactory information service can be provided to the user.

Furthermore, in accordance with the data output control apparatus according to another aspect of the present invention, the user enjoys the convenience of knowing the amount of use of the print service. Accordingly, the service provider also receives the advantage that an even more satisfactory information service can be provided to the user.

Furthermore, in accordance with the data output control apparatus according to another aspect of the present invention, until the sum of the total communications time in accordance with the service charge and the actual total communications time exceeds a predetermined time, the user is charged with only a fixed charge, saving payment of the service charge until the actual communications time of the portable terminal exceeds the predetermined time. Accordingly, the service provider also receives the advantage that an even more satisfactory information service can be provided to the user.

In accordance with the data output control apparatuses according to another aspect of the present invention, detailed information on a network can be readily obtained compared with before. In particular, the service charge as the price of the output service can be specifically calculated, and the service charge need not be calculated each time the output service is used. Furthermore, compared with the arrangement in which counters which count the number of outputs are provided in output terminals in order to count the number of outputs, each of the output terminals need not be provided with a counter, serving to reduce the cost of settling the service charge. Furthermore, even if the user does not carry enough money, the user is allowed to receive the service of output data. Thus, the user is allowed to receive the output data more easily, being allowed to readily obtain detailed information on a network and to pay the service charge with ease. The service provider receives benefits with respect to cost, with collection of the service charge easier and more secure and the procedure of settling the service charge facilitated. In addition, the service provider is allowed to specifically notify the user of the service charge, receiving an advantage that an information service with an adequate satisfaction can be provided.

Furthermore, in accordance with the data output control apparatus according to another aspect of the present invention, the output service is provided only to legitimate users of the output service provided by the apparatus; thus, illegitimate use by illegitimate users of the output service provided by the apparatus is inhibited. The service provider is allowed to bill the service charge to a specific person, collection of the service charge thus being easier and more secure, and the procedure of settling the service charge being facilitated. Accordingly, the service provider also receives the advantage that an even more satisfactory information service can be provided to the user.

Furthermore, in accordance with the data output control apparatus according to another aspect of the present invention, the user enjoys the convenience of knowing the amount of use of the output service. Accordingly, the service provider also receives the advantage that an even more satisfactory information service can be provided to the user.

Furthermore, in accordance with the data output control apparatus according to another aspect of the present invention, until the sum of the total communications time in accordance with the service charge and the actual total communications time exceeds a predetermined time, the user is charged with only a fixed charge, saving payment of the service charge until the actual communications time of the portable terminal exceeds the predetermined time. Accordingly, the service provider also receives the advantage that an even more satisfactory information service can be provided to the user.

DETAILED DESCRIPTION OF PREFERRED EMBODIMENTS

Figure 1:
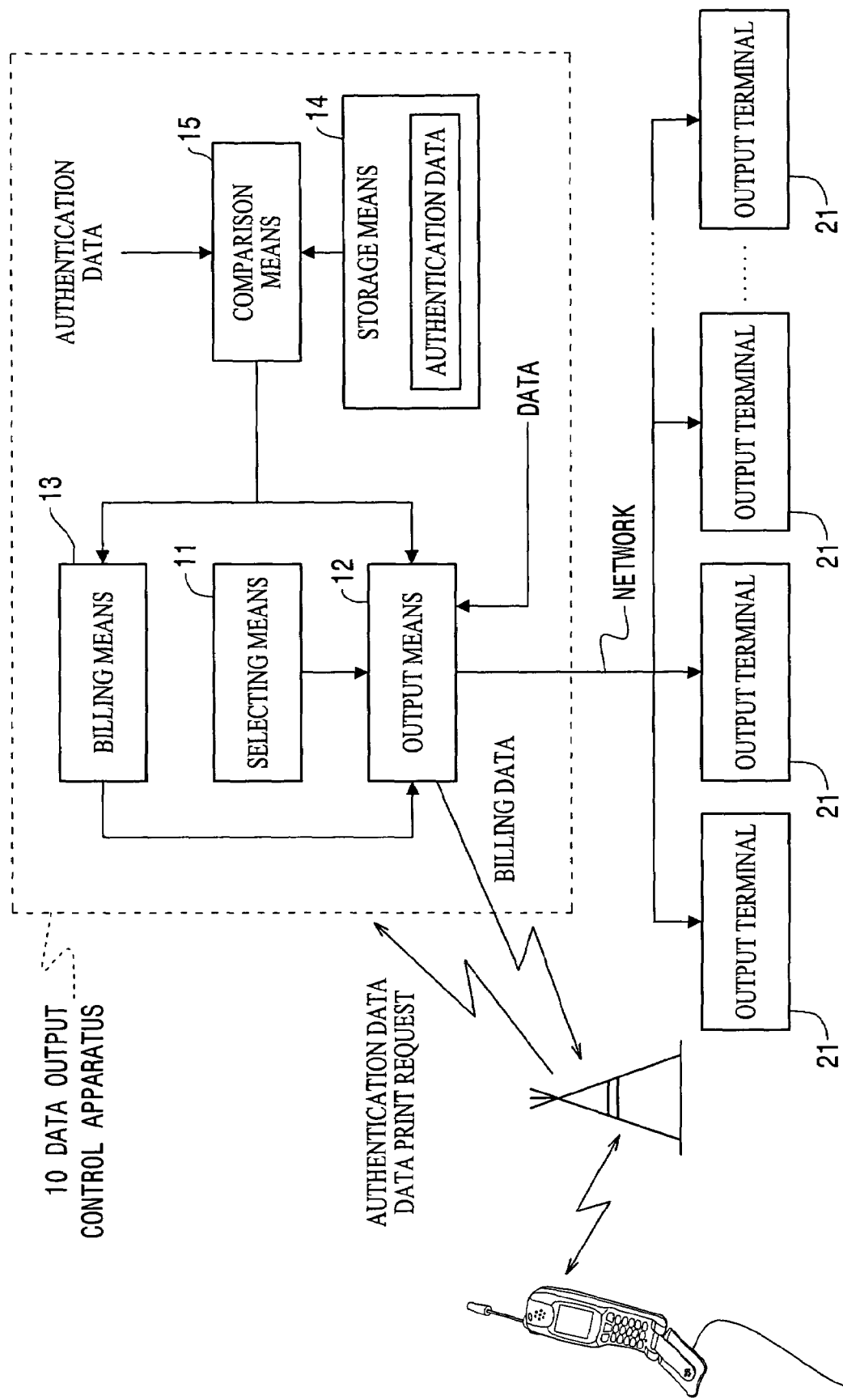
FIG. 1 is a schematic showing the structure of data output control apparatuses of the present invention.

A data output control apparatus of the present invention will be described below with reference to FIG. 1. FIG. 1 is a schematic diagram showing the structure of the data output control apparatuses of the present invention.

As shown in FIG. 1, a data output control apparatus 10 of the present invention is an apparatus which is communicatively connected, via a network, to a portable terminal 20 which is a portable communications device, carried by a user, that issue a data print request, and to a plurality of output terminals 21, disposed at various locations, that print data. In response to the data print request from the portable terminal 20, data associated with the data print request is output to the output terminals 21. The data output control apparatus 10 includes a selecting device 11 that selects one of the plurality of output terminals 21; an output device 12 that outputs the data associated with the data print request to the output terminal 21 selected by the selecting device 11; and a billing device that executes billing for a print service provided by the apparatus 10 in accordance with the result of use by the portable terminal 20. The data output control apparatus 10 calculates, according to a charge calculation definition, which defines the service charge as the price of the print service with regard to the result of use by the portable terminal 20, the service charge in accordance with the result of use by the portable terminal 20, and adds the calculated service charge to the communications charge of the portable terminal 20.

In accordance with the arrangement, when the data print request is received from the portable terminal 20, the selecting device 11 selects one of the plurality of output terminals 21; the output device 12 outputs the data associated with the data print request to the selected output terminal 21; and then, the output terminal 21 prints the data. Meanwhile, the billing device 13 calculates, according to the charge calculation definition, the service charge in accordance with the result of use by the portable terminal 20, and the calculated service charge is added to the communications charge of the portable terminal 20.

The result of use by the portable terminal 20 of the print service provided by the apparatus 10 includes, for example, the volume of the print data obtained, the number of prints by the output terminal 21, and the print specifications of the output terminal 21.

The billing device 13 may be implemented in any form as long as it allows calculation of the service charge according to the charge calculation definition. More specifically, it includes a storage device that stores a charge calculation definition table which defines the service charge as the price of the print service in accordance with the result of use by the portable terminal 20, so that the service charge in accordance with the result of use by the portable terminal 20 is calculated with reference to the charge calculation definition table in the storage device.

The selecting device 11 may be implemented in any form as long as it allows selection of one of the plurality of output terminals 21. More specifically, it selects an output terminal 21 which is presumably the most suitable for the user of the portable terminal 20 to receive the service of output data. In this case, the output terminal which is presumably the most suitable for the user of the portable terminal 20 to receive the service of output data is, for example, an output terminal 21 which is presumably nearest, in terms of distance or time, with reference to the position of the portable terminal 20, an output terminal 21 which is presumably nearest, in terms of distance or time, to a destination of the user of the portable terminal 20, an output terminal which allows the user to receive the service of output data quickest in time with considerations to the data output rates of the output terminals 21, or an output terminal 21 which provides the service of output data at a cheapest price.

The data associated with the data print request may be obtained, for example, by receiving from the portable terminal 20 or by obtaining from a source other than the apparatus 10 and the portable terminal 20. In the latter case, more specifically, the arrangement may be such that the data output control apparatus 10 is communicatively connected via a network to a data storage terminal which stores data, and the data output control apparatus 10 includes an obtaining device that obtains the data associated with the data print request from the data storage terminal, the output device 12 outputting the data obtained by the obtaining device to an output terminal 21 selected by the selecting device 11.

In accordance with the arrangement, when the data print request is received from the portable terminal 20, the obtaining means obtains the data associated with the data print request from the data storage terminal, and the output device 12 outputs the obtained data to the output terminal 21 selected by the selecting device 11.

As shown in FIG. 1, a data output control apparatus 10 according to another aspect of the present invention includes, in the data output apparatus 10, a storage device that stores, for each user of the portable terminal 20, authentication data that determines whether or not the user is a legitimate user of the print service, and a comparison device 15 that compares authentication data received from the portable terminal 20 and the authentication data in the storage device 14. The comparison device 15 compares the authentication data received from the portable terminal 20 and the authentication data in the storage device 14, and if they satisfy a predetermined relationship, permits an output by the output device 12 and execution of billing by the billing device 13.

In accordance with the arrangement, when the authentication data is received from the portable terminal 20, the comparison device 15 compares the received authentication data and the authentication data in the storage device 14, and if they satisfy a predetermined relationship, the output by the output device 12 and the execution of billing by the billing device 13 are permitted.

The predetermined relationship is satisfied, for example, if the authentication data to be compared and the authentication data for comparison coincide, if the result of an operation by a predetermined formula, using the authentication data to be compared, coincides with the authentication data for comparison, or the result of an operation by a predetermined formula, using the authentication data to be compared, coincides with the result of an operation by a predetermined formula, using the authentication data for comparison.

As shown in FIG. 1, according to a data output control apparatus 10 according to another aspect of the present invention, in the data output control apparatus 10, the output device 12 outputs billing data, indicating the result of billing by the billing device 13, to the portable terminal 20.

In accordance with the arrangement, the output device 12 outputs data to the output terminal 21 while outputting the billing data to the portable terminal 20.

Thus, on the portable terminal 20, the result of billing by the billing device 13 based on the billing data, i.e., the service charge as the price of the print service, is shown, allowing the user to know the amount of use of the print service.

As shown in FIG. 1, according to a data output control apparatus 10 according to another aspect of the present invention, in the data output apparatus 10, the communications charge is calculated as a fixed charge until the communications time of the portable terminal 20 exceeds a predetermined time, and until the sum of a communications time in accordance with the service charge and the actual communications time of the portable terminal 20 exceeds the predetermined time, the billing device 13 does not add the service charge to the communications charge while adding the communications time in accordance with the service charge to the actual communications time.

In accordance with the arrangement, until the sum of the communications time in accordance with the service charge and the actual communications time of the portable terminal 20 exceeds the predetermined time, the billing device 13 does not add the service charge to the communications charge while adding the communications time in accordance with the service charge to the actual communications time of the portable terminal 20.

Thus, the user of the portable terminal 20 is only charged with the fixed charge until the sum of the total communications time in accordance with the service charge and the actual total communications time of the portable terminal 20 exceeds the predetermined time.

As shown in FIG. 1, a data output control apparatus 10 according to another aspect of the present invention is an apparatus which is communicatively connected via a network to a portable terminal 20 which is a portable communications device, carried by a user, that issues a data output request, and to a plurality of output terminals 21, disposed at various locations, that output data. In response to the data output request from the portable terminal 20, data associated with the data output request is output to the output terminals 21. The data output control apparatus 10 includes a selecting device 11 that selects one of the plurality of output terminals 21; an output device 12 that outputs the data associated with the data output request to the output terminal 21 selected by the selecting device 1; and a billing device that executes billing for a output service provided by the apparatus 10 in accordance with the result of use by the portable terminal 20. The data output control apparatus 10 calculates, according to a charge calculation definition which defines the service charge as the price of the output service with regard to the result of use by the portable terminal 20, the service charge in accordance with the result of use by the portable terminal 20, and adds the calculated service charge to the communications charge of the portable terminal 20.

In accordance with the arrangement, when the data output request is received from the portable terminal 20, the selecting device 11 selects one of the plurality of output terminals 21; the output device 12 outputs the data associated with the data output request to the selected output terminal 21; and then, the output terminal 21 outputs the data. Meanwhile, the billing device 13 calculates, according to the charge calculation definition, the service charge in accordance with the result of use by the portable terminal 20, and the calculated service charge is added to the communications charge of the portable terminal 20.

The result of use by the portable terminal 20 of the output service provided by the apparatus 10 includes, for example, the volume of the output data obtained, the number of outputs by the output terminal 21, and the output specifications of the output terminal 21.

The billing device 13 may be implemented in any form as long as it allows calculation of the service charge according to the charge calculation definition. More specifically, it includes a storage device that stores a charge calculation definition table which defines the service charge as the price of the output service in accordance with the result of use by the portable terminal 20, so that the service charge in accordance with the result of use by the portable terminal 20 is calculated with reference to the charge calculation definition table in the storage device.

The selecting device 11 may be implemented in any form as long as it allows selection of one of the plurality of output terminals 21. More specifically, it selects an output terminal 21 which is presumably the most suitable for the user of the portable terminal 20 to receive the service of output data. In this case, the output terminal which is presumably the most suitable for the user of the portable terminal 20 to receive the service of output data is, for example, an output terminal 21 which is presumably nearest, in terms of distance or time, with reference to the position of the portable terminal 20, an output terminal 21 which is presumably nearest, in terms of distance or time, to a destination of the user of the portable terminal 20, an output terminal which allows the user to receive the service of output data quickest in time with considerations to the data output rates of the output terminals 21, or an output terminal 21 which provides the service of output data at a cheapest price.

The output terminal 21 may be implemented in any form as long as it allows output of data, and includes, for example, a display that displays data, a sound output device that outputs the data as sound, etc., and a printer that prints data.

The data associated with the data output request may be obtained, for example, by receiving from the portable terminal 20 or by obtaining from a source other than the apparatus 10 and the portable terminal 20. In the latter case, more specifically, the arrangement may be such that the data output control apparatus 10 is communicatively connected via a network to a data storage terminal which stores data, and the data output control apparatus 10 includes an obtaining device that obtains data associated with a data output request from the data storage terminal, the output device 12 outputting the data obtained by the obtaining device to an output terminal 21 selected by the selecting device 11.

In accordance with the arrangement, when the data output request is received from the portable terminal 20, the obtaining device obtains the data associated with the data output request from the data storage terminal, and the output device 12 outputs the obtained data to the output terminal 21 selected by the selecting device 11.

As shown in FIG. 1, a data output control apparatus 10 according to another aspect of the present invention includes, in the data output apparatus 10, a storage device that stores, for each user of the portable terminal 20, authentication data that determines whether or not the user is a legitimate user of the output service, and a comparison device 15 that compares authentication data received from the portable terminal 20 and the authentication data in the storage device 14. The comparison device 15 compares the authentication data received from the portable terminal 20 and the authentication data in the storage device 14, and if they satisfy a predetermined relationship, permits an output by the output device 12 and execution of billing by the billing device 13.

In accordance with the arrangement, when the authentication data is received from the portable terminal 20, the comparison device 15 compares the received authentication data and the authentication data in the storage device 14, and if they satisfy a predetermined relationship, the output by the output device 12 and the execution of billing by the billing device 13 are permitted.

The predetermined relationship is satisfied, for example, if the authentication data to be compared and the authentication data for comparison coincide, if the result of an operation by a predetermined formula, using the authentication data to be compared, coincides with the authentication data for comparison, or the result of an operation by a predetermined formula, using the authentication data to be compared, coincides with the result of an operation by a predetermined formula, using the authentication data for comparison.

As shown in FIG. 1, according to a data output control apparatus 10 according to another aspect of the present invention, in the data output control apparatus 10, the output device 12 outputs billing data, indicating the result of billing by the billing device 13, to the portable terminal 20.

In accordance with the arrangement, the output device 12 outputs data to the output terminal 21 while outputting the billing data to the portable terminal 20.

Thus, on the portable terminal 20, the result of billing by the billing device 13 based on the billing data, i.e., the service charge as the price of the output service, is shown, allowing the user to know the amount of use of the output service.

As shown in FIG. 1, according to a data output control apparatus 10 according to another aspect of the present invention, in the data output apparatus 10, the communications charge is calculated as a fixed charge until the communications time of the portable terminal 20 exceeds a predetermined time, and until the sum of a communications time in accordance with the service charge and the actual communications time of the portable terminal 20 exceeds the predetermined time, the billing device 13 does not add the service charge to the communications charge while adding the communications time in accordance with the service charge to the actual communications time.

In accordance with the arrangement, until the sum of the communications time in accordance with the service charge and the actual communications time of the portable terminal 20 exceeds the predetermined time, the billing device 13 does not add the service charge to the communications charge while adding the communications time in accordance with the service charge to the actual communications time of the portable terminal 20.

Thus, the user of the portable terminal 20 is charged with only the fixed charge until the sum of the total communications time in accordance with the service charge and the actual total communications time of the portable terminal 20 exceeds the predetermined time.

An embodiment of the present invention will be described below with reference to FIG. 2 to FIG. 7, which show a data output control apparatus.

Figure 2:
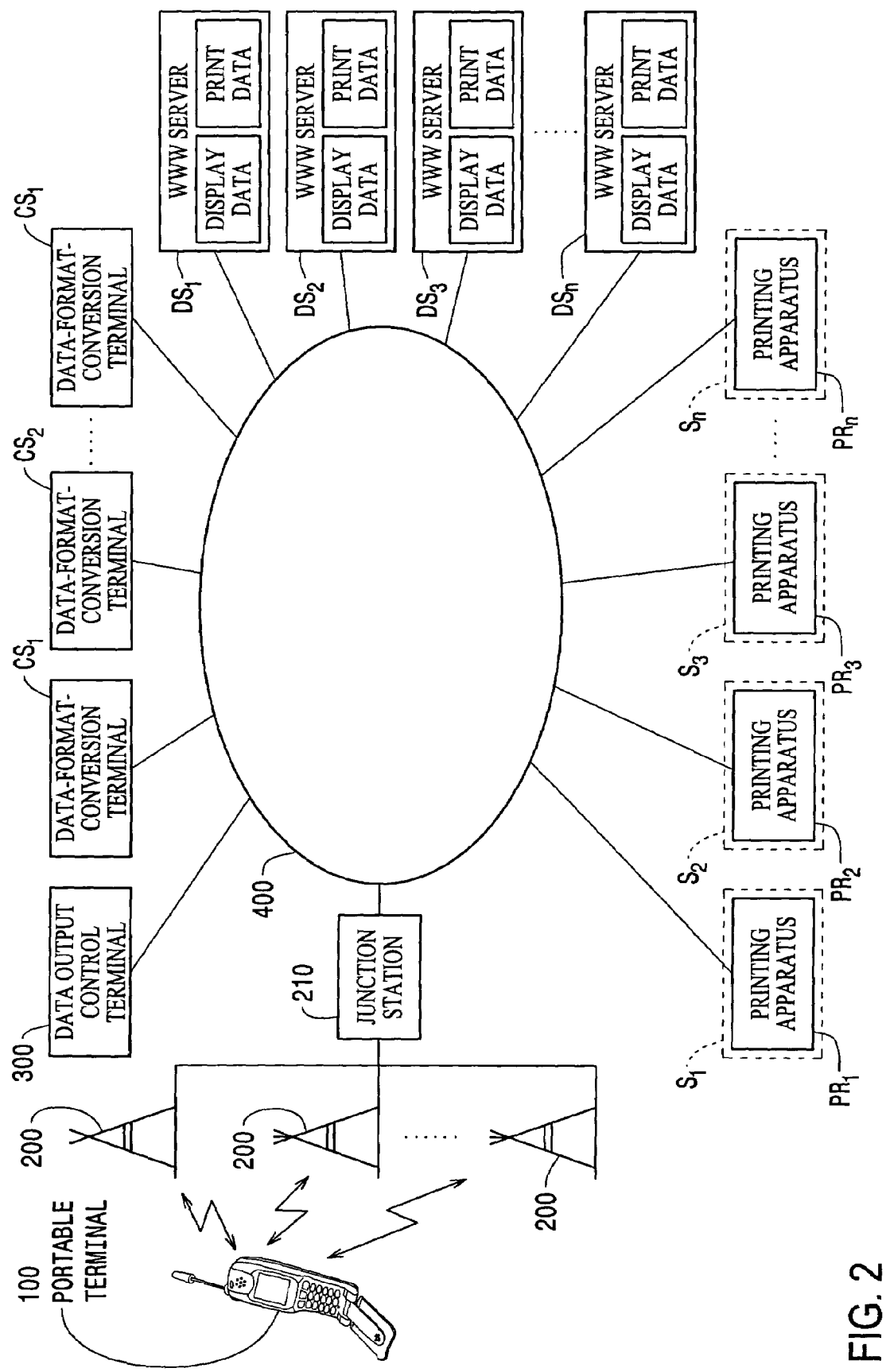
FIG. 2 is a schematic showing the structure of a network system in which a data output control apparatus according to the present invention is applied.

In this embodiment, as shown in FIG. 2, the data output control apparatus according to the present invention is applied to a case where, by a portable terminal 100 carried by a user, such as a cellular phone, and a data output control terminal 300, communicatively connected via the Internet 400 to printing apparatuses $PR_1$ to $PR_n$, respectively provided at a plurality of shops $S_1$ to $S_n$ existing at various locations, a service provider, in response to a data print request from the user, provides a service such that data associated with the data print request received from one of WWW (World Wide Web) servers $DS_1$ to $DS_m$ is obtained and output to one of the printing apparatuses $PR_1$ to $PR_n$. For ease in understanding the present invention, only a single portable terminal 100 is shown; however, a plurality of different types of the portable terminal 100 can be connected to the Internet 400.

First, the structure of a network system in which the data output control apparatus according to the present invention is applied will be described with reference to FIG. 2. FIG. 2 is a schematic showing the configuration of the network system in which the data output control apparatus according to the present invention is applied.

As shown in FIG. 2, a junction station 210 which relays communications between the portable terminal 100 and the Internet 400, the printing apparatuses $PR_1$ to $PR_n$ that print data, the WWW servers $DS_1$ to $DS_m$ on which data is stored, the data output control apparatus 300 that obtains data associated with a data print request from one of the WWW servers $DS_1$ to $DS_m$ and outputs the data to one of the printing apparatuses $PR_1$ to $PR_n$, and data-format-conversion terminals $CS_1$ to $CS_l$ that convert the data obtained by the data output control terminal 300 into data which can be printed by the printing apparatuses $PR_1$ to $PR_n$, are connected to the Internet 400.

A plurality of base stations 200 which communicate with the portable terminal 100 by wireless are connected to the junction station 210. When the portable terminal 100 is connected to the Internet 400, the junction station 210 serves on behalf of the portable terminal 100 as a terminal on the Internet 400, such that data which is received from the portable terminal 100 via a base station 200 is transmitted to a designated terminal via the Internet 400, and data on the designated terminal connected to the Internet 400 is transmitted to the portable terminal 100 via the base station 200. The portable terminal 100 simultaneously communicates with at least three base stations 200, and the junction station 210 obtains the difference in the amount of time taken for radio waves from the portable terminal 100 to reach each of the base stations 200, so that the position of the portable terminal 100 can be determined based on the time difference obtained.

Each of the WWW servers $DS_1$ to $DS_m$ includes a storage unit which stores display data to display on the portable terminal 100 and print data to print by the printing apparatuses $PR_1$ to $PR_n$ corresponding to the display data, and a request processing unit which, in response to a request from a terminal connected to the Internet 400, such as the junction station 210 and the data output control terminal 300, transmits the data in the storage unit to the terminal.

The request processing unit, the functionality thereof being implemented by a CPU which is not shown, executing a program which is stored in an external storage device, etc., transmits either the display data or the print data in the storage unit in response to a data transmission request from an external terminal (the portable terminal 100, the data output control terminal 300, etc.). The determination as to which of the display data or the print data is transmitted is performed according to a URL included in the data transmission request. The storage unit stores, as the print data, various files of, for example, text data, still picture data, sound data, motion picture data in MPEG, etc., 3D image data in VRML, etc., or program data in JAVA etc., and HTML (Hyper Text Markup Language) files.

The data-format-conversion terminals $CS_1$ to $CS_l$ are terminals that execute data-format-conversion processes in which the data obtained by the data output control terminal 300 is converted into data which can be printed by the printing apparatuses $PR_1$ to $PR_n$. According to the transmission load of the Internet 400 or the processing load of the data-format-conversion terminals CS, one or more of the data-format-conversion terminals $CS_1$ to $CS_l$ is selected so that the data-format-conversion processes will be executed on the selected data-format-conversion terminals CS. More specifically, in the order for the transmission load of the Internet 400 or the processing load of the data-format-conversion terminals CS to be low, one or more of the data-format-conversion terminals $CS_1$ to $CS_l$ is selected as required for the data-format-conversion processes.

Each of the data-format-conversion terminals CS on which the data-format-conversion processes are executed receives from the data output control terminal 300 a data-format-conversion request and the data to be converted; and by the data-format-conversion processes, of the data obtained by the data output control terminal 300, converts data of a predetermined format to data which can be printed by the corresponding printing apparatuses $PR_1$ to $PR_n$; and transmits the converted data to the data output control terminal 300.

For example, if the format conversion processes are executed on the data-format-conversion terminals $CS_1$ to $CS_3$, the data-format-conversion terminal $CS_1$ converts, of the data obtained by the data output control terminal 300, data in a predetermined format A (e.g. HTML format) into data which can be printed by the printing apparatuses $PR_1$ to $PR_5$; the data-format-conversion terminal $CS_2$ converts, of the data obtained by the data output control terminal 300, data in a predetermined format B (e.g. JPEG format) into data which can be printed by the printing apparatuses $PR_6$ to $PR_{10}$; the data-format-conversion terminal $CS_3$ converts, of the data obtained by the data output control terminal 300, data in a predetermined format C (e.g. WORD™ document format) into data which can be printed by the printing apparatuses $PR_{11}$ to $PR_{15}$; and so forth. In this case, apparently, the printing apparatuses $PR_1$ to $PR_5$ serve as apparatuses dedicated to print data in the predetermined data format A, the printing apparatuses $PR_6$ to $PR_{10}$ serve as apparatuses dedicated to print data in the predetermined data format B, and the printing apparatuses $PR_{11}$ to $PR_{15}$ serve as apparatuses dedicated to print data in the predetermined data format C.

In addition to converting the data obtained by the data output control terminal 300, each of the data-format-conversion terminals CS on which the data-format-conversion processes are executed, in accordance with display capabilities (the number of lines to be displayed, display resolution, etc.) of each type of the portable terminal 100, generates preview data which can be displayed on the portable terminal 100, i.e., an image of the data obtained by the data output control terminal 300 as printed by a printing apparatus PR, and the preview data generated is transmitted to the data output control terminal 300.

Thus, the data output control terminal 300 transmits the data-format-conversion request and the data obtained from a WWW server DS to the data-format-conversion terminal CS corresponding to the printing apparatus PR by which the data associated with the data print request is to be printed, and as a response thereto, receives the data which can be printed by the printing apparatus PR by which the data is to be printed and the preview data.

Figure 3:
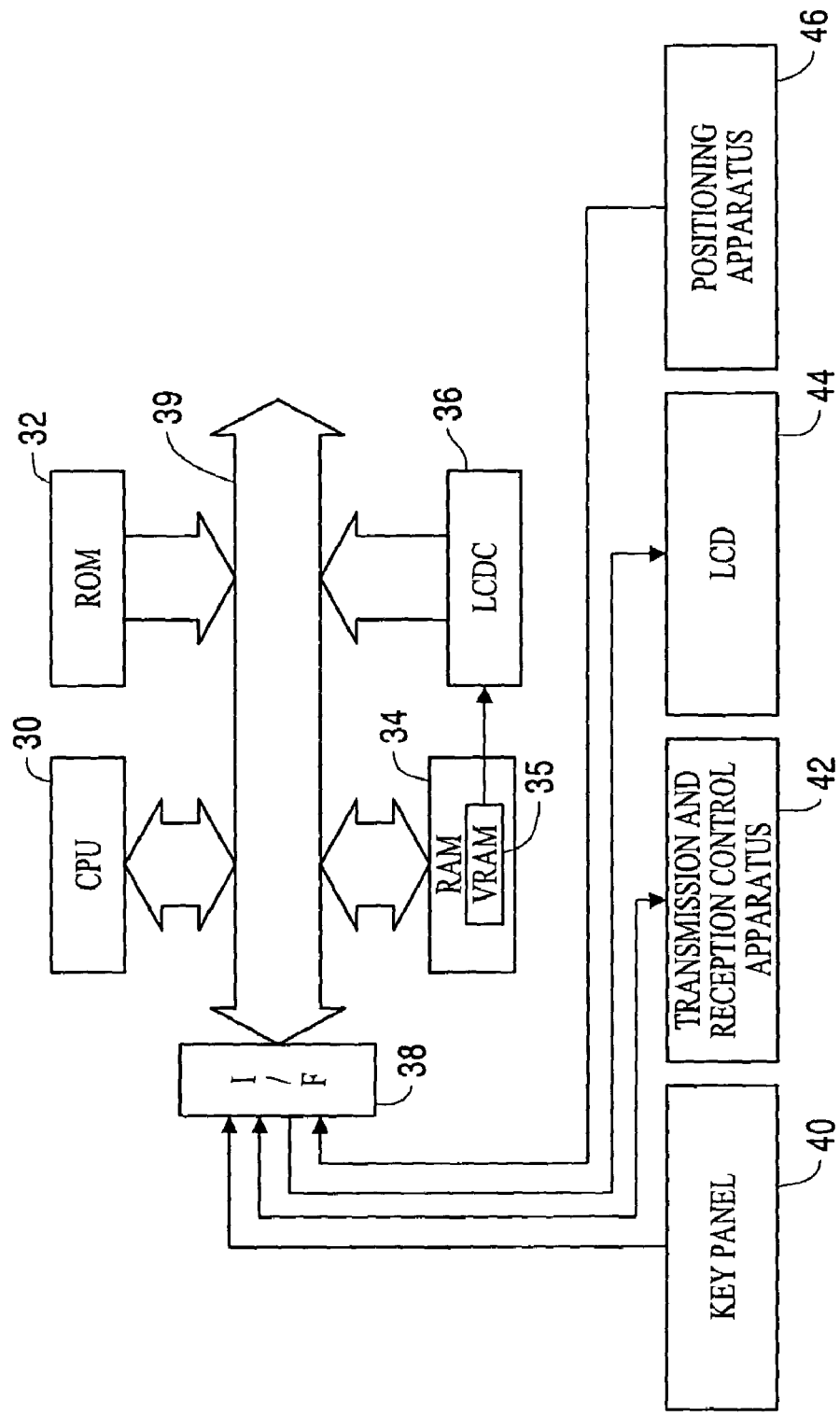
FIG. 3 is a schematic showing the structure of a portable terminal 100.

Next, the structure of the portable terminal 100 will be described with reference to FIG. 3. FIG. 3 is a schematic showing the structure of the portable terminal 100.

As shown in FIG. 3, the portable terminal 100 includes a CPU 30 which controls operations and the overall system based on a control program; a ROM 32 which stores, in advance, the control programs for the CPU 30, etc. in a predetermined area; a RAM 34 which stores data read from the ROM 32, etc. and operation results required in the course of the operations by the CPU 30; an LCDC (Liquid Crystal Display Controller) 36 that converts data stored in a specific area of the RAM 34 into an image signal and outputs the image signal to an LCD (Liquid Crystal Display) 44; and an I/F 38 which intermediates data input from and data output to external apparatuses; the components being mutually connected via a bus 39, which is a signal line for transferring data, so as to allow exchange of data.

As the external apparatuses, a key panel 40 which serves as a human interface and which allows input of data using a plurality of keys, a transmission and reception control apparatus 42 that communicates with the base stations 200 by wireless, the LCD 44 on which an image is displayed based on the image signal, and a positioning apparatus 46 that determines the location of the current position are connected to the I/F 38.

The ROM 32 stores, in addition to the control program for the CPU 30, authentication data for determining whether or not the user is a legitimate user of the print service provided by the data output control terminal 300.

The RAM 34 includes, as the specific area, a VRAM 35 that stores the display data for display on the LCD 44, the VRAM 35 allowing independent accesses from the CPU 30 and the LCDC 36.

The LCDC 36 sequentially reads, at a predetermined cycle, the display data stored in the VRAM 35 from the start address, converts the display data which has been read into an image signal, and outputs the image signal to the LCD 44.

The positioning apparatus 46 employs GPS (Global Positioning System), etc., to receive time signals from orbiting satellites which transmit the time signals indicating the current time, determining the location of the current position based on the time difference indicated by the time signals and the orbits of the orbital satellites.

Figure 4:
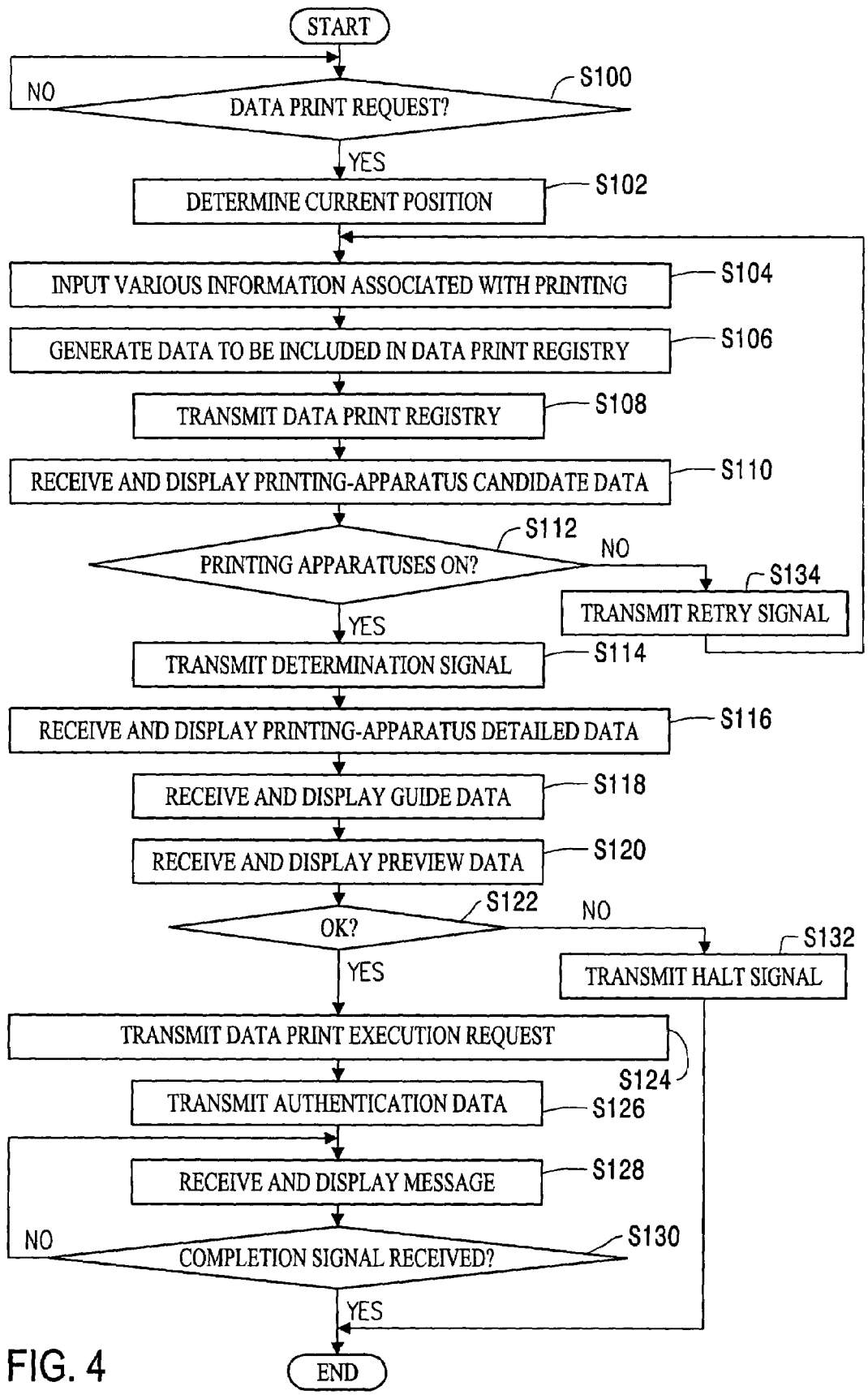
FIG. 4 is a flowchart showing data print request processes.

The CPU 30 is formed of a microprocessing unit MPU, etc., and activates a predetermined program stored in a predetermined area of the ROM 32 to execute, according to the program, data print request processes shown in the flowchart of FIG. 4. FIG. 4 is a flowchart showing the data print request processes.

In the data printing request processes, by issuing a data print request, a request is made that data on a WWW server DS designated by the user be printed by one of the printing apparatuses $PR_1$ to $PR_n$, and when executed by the CPU 30, as shown in FIG. 4, initially moves to step S100.

In step S100, in accordance with an input by the user via the key panel 40, it is determined whether or not a data print request has been made. If it is determined that there is a data print request (Yes), the processes move to step S102, in which the positioning apparatus 46 determines the location of the current position. The processes then move to step S104, in which various information associated with printing is input via the key panel 40. As the various information associated with printing, the user inputs, for example, a URL which uniquely identifies the location of the WWW server DS on the Internet, which stores the print data to be printed, a desired service area which is the approximate location where the service of output data is desired, print specifications of the printing apparatus PR, such as the size of paper, a designation of color/monochrome, printing resolution, and printing speed, a data format of the print data to be printed, and when a printing apparatus PR is to be directly specified, a printing apparatus ID that identifies the printing apparatus PR. All of these input items are not necessarily required, but are selectively input according to user requirements. As for the URL of the WWW server DS, however, unless otherwise specified, the URL of the WWW server DS being browsed at that time by the user with the portable terminal 100 is automatically input.

Next, the processes move to step S106, in which data to be included in the data print request is generated based on the various information associated with printing which has been input. More specifically, the data to be included in the data print request is generated with the location of the current position, determined in step S102, as portable-terminal-position data that identifies the location of the current position; the URL of the WWW server DS as printing target storage location data indicating the URL; the desired service area, if it is input, as desired service area data indicating the desired service area; the print specifications of the printing apparatus PR, if they are input, as print specification data indicating the print specifications; the data format, if it is input, as print format data indicating the data format; and the printing apparatus ID of the printing apparatus PR, if it is input, as printing-apparatus identification data indicating the printing apparatus ID.

Next, the processes move to step S108, in which the data print request is transmitted to the data output control terminal 300. The processes then move to step S110, in which, as a response thereto, printing-apparatus candidate data listing several candidates of the printing apparatus PR, which are presumably the most suitable for the user to receive the service of output data, is received from the data output control terminal 300, and based on the printing-apparatus candidate data received, the listed candidates of the printing apparatus PR are displayed on the LCD 44. The processes then move to step S112.

In step S112, it is determined whether or not the printing apparatus which is desired for the service of output data is included in the candidates of the printing apparatus PR displayed on the LCD 44. If it is determined, by an input via the key panel 40 selecting one of the candidates of the printing apparatus PR displayed on the LCD 44, that the printing apparatus PR which is desired for the service of output data is included (Yes), the processes move to step S114.

In step S114, a determination signal, which indicates that the printing apparatus PR has been determined, is transmitted to the data output control terminal 300. The processes then move to step S116, in which as a first response to the transmission of the determination signal, printing-apparatus information, which is detailed information regarding the printing apparatus PR determined (location, print specifications, etc. of the printing apparatus PR) is received from the data output control terminal 300, and based on the printing-apparatus information received, the detailed information regarding the printing apparatus PR is displayed on the LCD 44. The processes then move to step S118.

In step S118, as a second response to the transmission of the determination signal, guide data, indicating guide information (route information, map information, etc.) to guide the user from the position of the portable terminal 100 to the position where the determined printing apparatus PR is provided, is received from the data output control terminal 300, and based on the guide data received, the guide information is displayed on the LCD 44. The processes then move to step S120, in which as a third response to the transmission of the determination signal, preview data is received from the data output control terminal 300, and based on the received preview data, an image of a print by the determined printing apparatus PR is displayed on the LCD 44. The processes then move to step S122.

In step S122, it is determined whether or not the print data to be printed is actually the image displayed on the LCD 44.

If it is determined that the image displayed on the LCD 44 is correct (Yes) by an input via the key panel 40 which selects that the image displayed on the LCD 44 is correct, the processes move to step S124. At this time, if the preview data is formed of a plurality of data, the part thereof which is desired to be printed can be specified.

In step S124, a data print execution request is transmitted to the data output control terminal 300. The processes then move to step S126, in which the authentication data in the ROM 32 is transmitted to the data output control terminal 300. The processes then move to step S128, in which as a response thereto, a message is received from the data output control terminal 300, and the received message is displayed on the LCD 44. The processes then move to step S130, in which it is determined whether or not a completion signal, which indicates completion of the data print, has been received from the data output control terminal 300. If it is determined that the completion signal has been received (Yes), the series of processes is exited; however, if it is determined otherwise (No), step S128 is repeated until the completion signal is received.

On the other hand, if it is determined that the image displayed on the LCD 44 is wrong (No) according to an input via the key panel 40 which selects that the image displayed on the LCD 44 is wrong, the processes move to step S132, in which a halt signal, which is a request for halting the data print, is transmitted to the data output control terminal 300. The series of processes is then exited.

On the other hand, if it is determined in step S112, according to an input via the key panel 40 which selects the desired printing apparatus is not included in the candidates of the printing apparatus PR displayed on the LCD 44, that the printing apparatus PR which is desired for the service of output data is not included (No), the processes move to step S134, in which a retry signal, which is a request to search again for the printing apparatus PR which is presumably the most suitable to receive the service of output data, is transmitted to the data output control terminal 300. The processes then move to step S104.

On the other hand, if it is determined in step S100 that there is no data print request from the user (No), the processes wait in step S100 until a data print request is issued.

Figure 5:
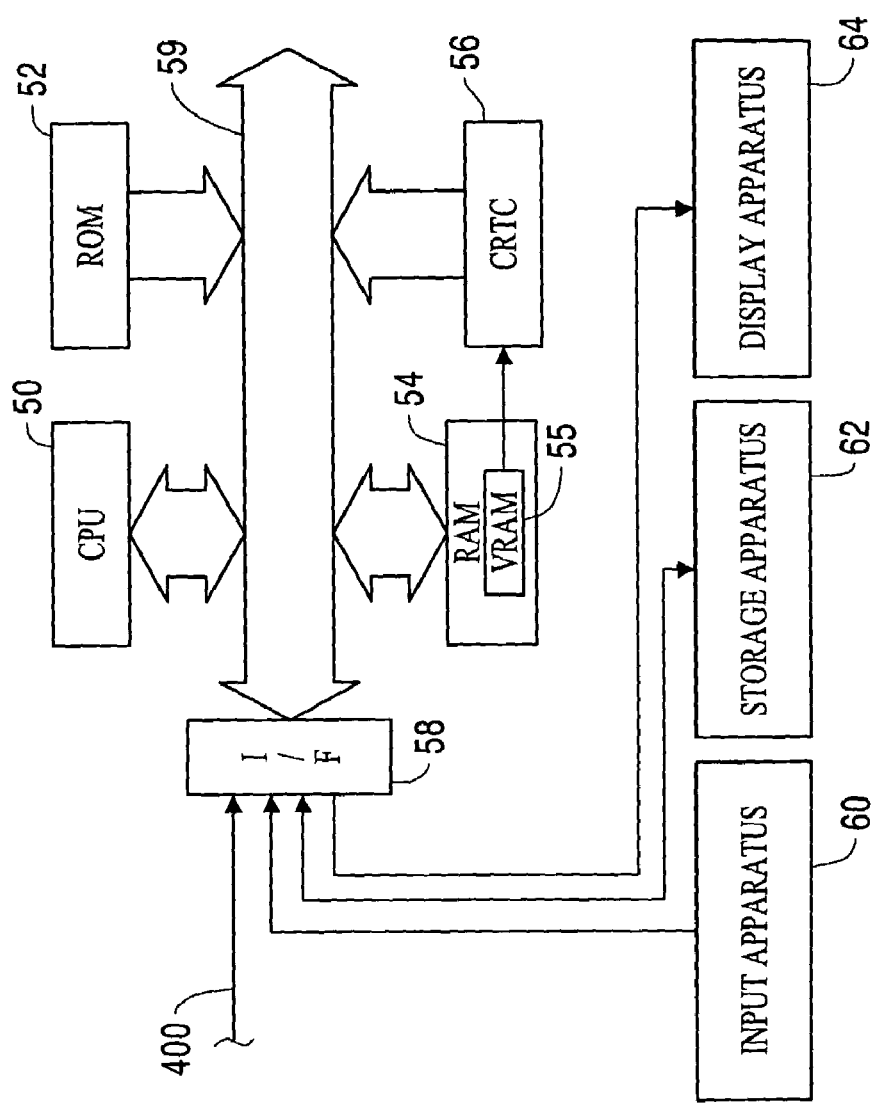
FIG. 5 is a schematic showing the structure of a data output control terminal 300.

Next, the structure of the data output control terminal 300 will be described with reference to FIG. 5. FIG. 5 is a schematic showing the structure of the data output control terminal 300.

The data output control terminal 300 obtains data associated with a data print request from the portable terminal 100, selects one of the printing apparatuses PR$_1$ to PR$_n$ by which the data is to be printed, and outputs the data obtained to the selected printing apparatus PR. As shown in FIG. 5, the data output control terminal 300 includes a CPU 50 which controls operations and the overall system based on a control program; a ROM 52 which stores, in advance, the control program for the CPU 50, etc. in a predetermined area; a RAM 54 which stores data which has been read from the ROM 52, etc. and operation results required in the course of the operations by the CPU 50; a CRTC 56 that converts the data stored in a specific area of the RAM 54 into an image signal and outputting the image signal; and an I/F which intermediates data input from and data output to external apparatuses; the components being mutually connected via a bus 59, which is a signal line that transfers data, so as to allow exchange of data.

As the external apparatuses, an input apparatus 60 including a keyboard, a mouse, etc., which serves as a human interface and which allows input of data, a storage apparatus 62 which stores data, tables, etc. as files, a display apparatus 64 on which an image is displayed based on the image signal, and a signal line that connects to the Internet 400 are connected to the I/F 58.

The RAM 54 includes, as the specific area, a VRAM 55 that stores the display data to display on the display apparatus 64, the VRAM 55 allowing independent accesses from the CPU 50 and the CRTC 56.

The CRTC 56 sequentially reads, at a predetermined cycle, the display data stored in the VRAM 55 from the start address, converts the display data which has been read into an image signal, and outputs the image signal to the display apparatus 64.

The storage apparatus 62 stores printing-apparatus information regarding the printing apparatuses PR, which is required to select one of the printing apparatuses PR$_1$ to PR$_n$ by which data is to be printed. The printing-apparatus information is configured by registering, for each of the printing apparatuses PR$_1$ to PR$_n$, printing apparatus position data that identifies the location of the printing apparatus PR, print format data indicating the data format which can be converted by the data-format-conversion terminal CS corresponding to the printing apparatus PR (i.e., a data format which allows printing by the printing apparatus PR), print specification data indicating the print specifications of the printing apparatus PR, and printing-apparatus identification data indicating the printing apparatus ID.

In addition, the storage apparatus 62 stores a charge calculation definition table which defines the service charge as the price of the print service in accordance with, for example, the volume of obtained print data, the number of prints by the printing apparatus PR, and the print specifications of the printing apparatus PR, as the result of use by the portable terminal 100 of the print service provided by the data output control terminal 300. The storage apparatus 62 also stores authentication data, for each of the users of the portable terminal 100, to determine whether or not the user is a legitimate user of the print service provided by the data output control terminal 300.

Figure 6A:
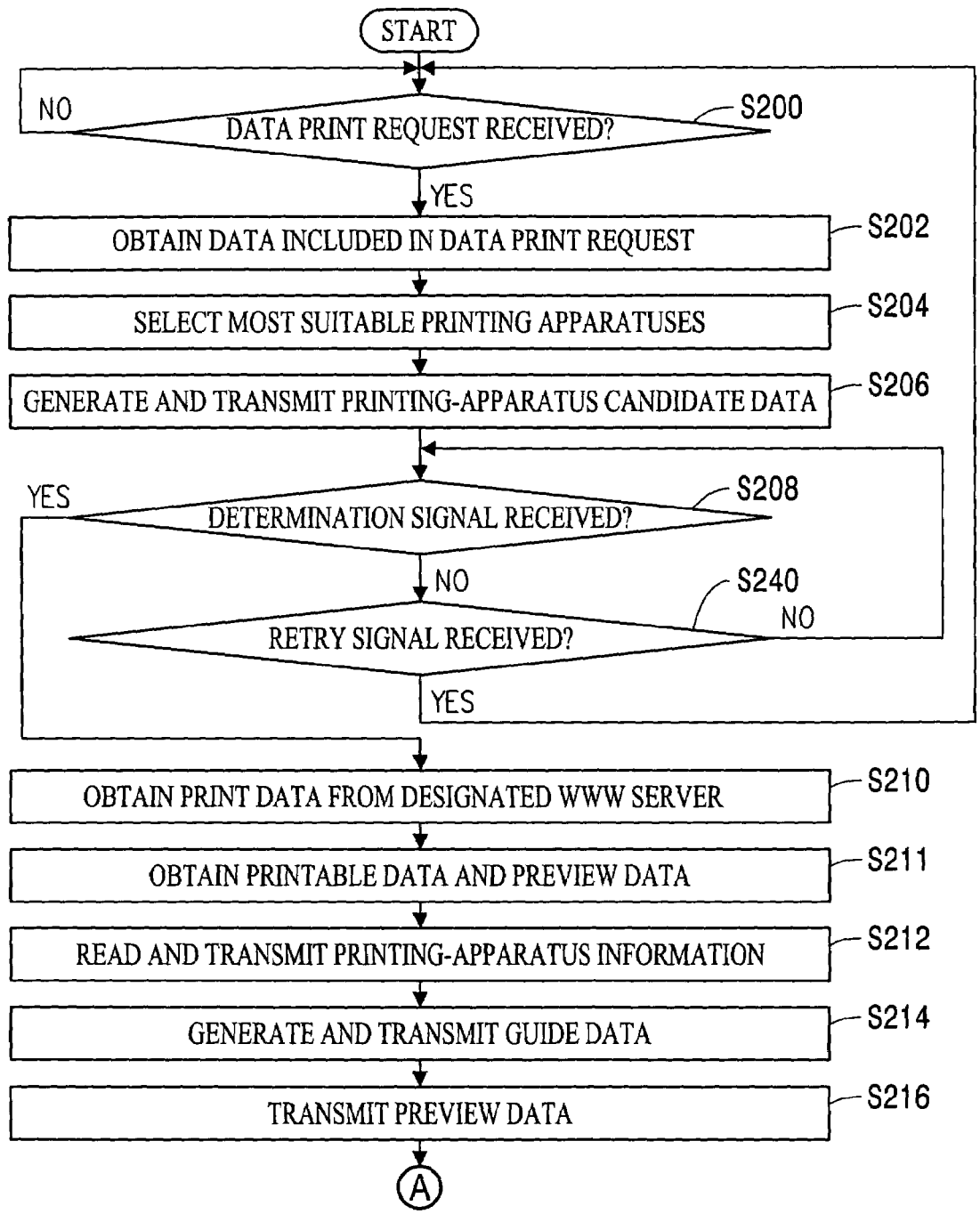
FIG. 6 is a flowchart showing data output control processes.
Figure 6B:
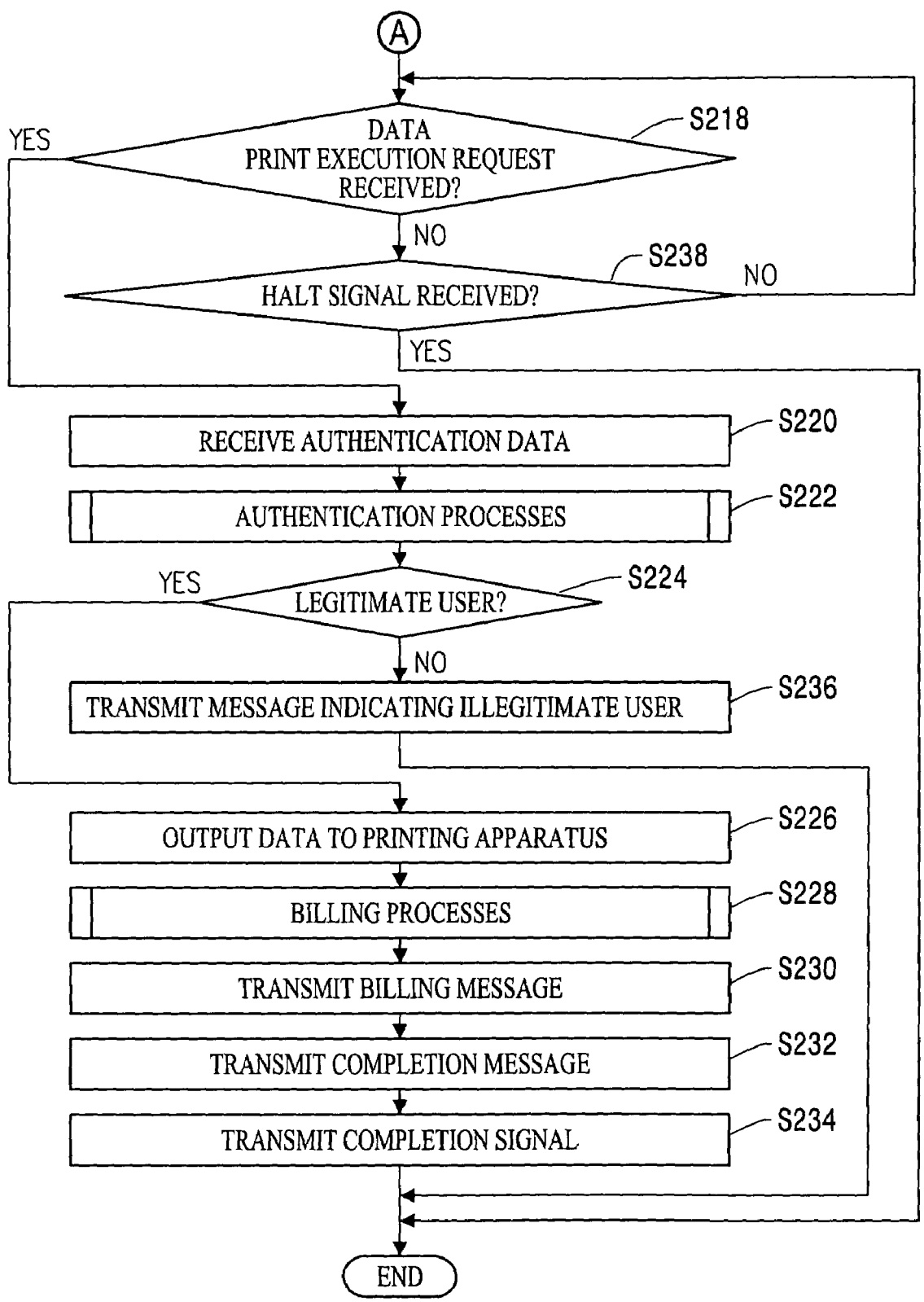

The CPU 50 includes a microprocessing unit MPU, etc., and activates a predetermined program stored in a predetermined area of the ROM 52 to execute, according to the program, data output control processes shown in the flowchart of FIG. 6. FIG. 6 is a flowchart showing the data output control processes.

The data output control processes obtain, from a WWW server DS, print data associated with a data print request from the portable terminal 100, selects one of the printing apparatuses PR, which is presumably the most suitable for the user of the portable terminal 100 to receive the service of output data, and outputs the print data obtained to the selected printing apparatus PR, and when executed by the CPU 50, as shown in FIG. 6, initially moves to step S200.

In step S200, it is determined whether or not the data print request has been received from the portable terminal 100. If it is determined that the data print request has been received (Yes), the processes move to step S202, in which data included in the received data print request (including at least the portable-terminal-position data and the print target storage location data) is obtained. The processes then move to step S204, in which a printing apparatus PR which is presumably the most suitable for the user of the portable terminal 100 to receive the service of output data is selected.

More specifically, in step S204, a search is performed on the printing apparatus position data in the storage apparatus 62 based on the portable-terminal-position data obtained, selecting several printing apparatuses PR which are presumably nearest, in terms of distance or time, with reference to the position of the portable terminal 100. If desired service area data is included in the data print request, a search is performed on the printing apparatus position data in the storage apparatus 62 based on the desired service area data, selecting all the printing apparatuses PR in the area identified by the desired service area data. If print specification data is included in the data print request, a search is performed on the print specification data in the storage apparatus 62 based on the obtained print specification data, selecting all the printing apparatuses PR which comply with the print specification data.

If print format data is included in the data print request, a search is performed on the print format data in the storage apparatus 62 based on the print format data obtained, selecting all the printing apparatuses PR which comply with the print format data. If printing-apparatus identification data is included in the data print request, a search is performed on the printing-apparatus identification data in the storage apparatus 62 based on the obtained printing-apparatus identification data, selecting a printing apparatus PR corresponding to the printing-apparatus identification data. If these data are compositely included in the data print request, a search is performed based on each of the data. If the desired service area data is included, and the position identified by the portable-terminal-position data is not included in the area identified by the desired service area data, a search based on the portable-terminal-position data is not performed. If the printing-apparatus identification data is included, a search based on other data is not performed.

Next, in step S204, printing-apparatus candidate data which lists the printing apparatuses PR selected in step S202 is generated, and the printing-apparatus candidate data generated is transmitted to the portable terminal 100. The processes then move to step S208.

In step S208, it is determined whether or not the determination signal has been received from the portable terminal 100. If it is determined that the determination signal has been received (Yes), the processes move to step S210, in which print data is obtained from the WWW server DS identified by the URL included in the obtained print target storage location data. The processes then move to step S211, in which the print data obtained is transmitted to the data-format-conversion terminal CS which allows conversion of the print data and which corresponds to the determined printing apparatus PR, and as a response thereto, obtains from the data-format-conversion terminal CS data which can be printed by the determined printing apparatus PR and preview data. The processes then move to step S212.

In step S212, printing-apparatus information regarding the determined printing apparatus is read from the storage apparatus 62, and the printing-apparatus information which has been read is transmitted to the portable terminal 100. The processes then move to step S214, in which guide data regarding the determined printing apparatus PR is generated, and the generated guide data is transmitted to the portable terminal 100. The processes then move to step S216, in which the preview data is transmitted to the portable terminal 100. The processes then move to step S218.

In step S218, it is determined whether or not a data print execution request has been received from the portable terminal 100. If it is determined that the data print request has been received (Yes), the processes move to step S220, in which authentication data is received from the portable terminal 100. The processes then move to step S222, in which authentication processes are executed, based on the received authentication data, in order to determine whether or not the user of the portable terminal 100 is a legitimate user of the print service provided by the data output control terminal 300. In step S222, more specifically, the received authentication data and the authentication data in the storage apparatus 62 are compared, and if they match, it is determined that the user of the portable terminal 100 is determined as a legitimate user, but if otherwise, it is determined that the user of the portable terminal 100 is an illegitimate user.

Next, in step S224, as a result of the authentication processes in step S222, in which it is determined whether or not the user of the portable terminal 100 is a legitimate user, if the user is determined as a legitimate user (Yes), the processes move to step S226, in which the data which can be printed by the determined printing apparatus PR is transmitted to the printing apparatus PR. The processes then move to step S228, in which billing processes are executed in which billing is executed in accordance with the result of usage by the portable terminal 100 of the print service provided by the data output control terminal 300.

Next, the processes move to step S230, in which a billing message, which indicates the service charge calculated in the billing processes of step S228 is transmitted to the portable terminal 100. The processes then move to step S232, in which a completion message, which indicates completion of the data print, is transmitted to the portable terminal 100. The series of processes is then exited.

On the other hand, if it is determined in step S224 that the user of the portable terminal 100 is not a legitimate user (No), the processes move to step S236, in which a message indicating that the user is an illegitimate user is transmitted to the portable terminal 100. The series of processes is then exited.

On the other hand, if it is determined in step S218 that the data print execution request has not been received from the portable terminal 100 (No), the processes move to step S238, in which it is determined whether or not the halt signal has been received from the portable terminal 100. If it is determined that the halt signal has been received (Yes), the series of processes is exited, but if otherwise (No), the processes move to step S218.

On the other hand, if it is determined in step S208 that the determination signal has not been received from the portable terminal 100 (No), the processes move to step S240, in which it is determined whether or not the retry signal has been received from the portable terminal 100. If it is determined that the retry signal has been received (Yes), the processes move to step S200, but if otherwise (No), the processes move to step S208.

On the other hand, if it is determined in step S200 that the data print request has not been received from the portable terminal 100 (No), the processes wait in step S200 until the data print request is received.

Figure 7:
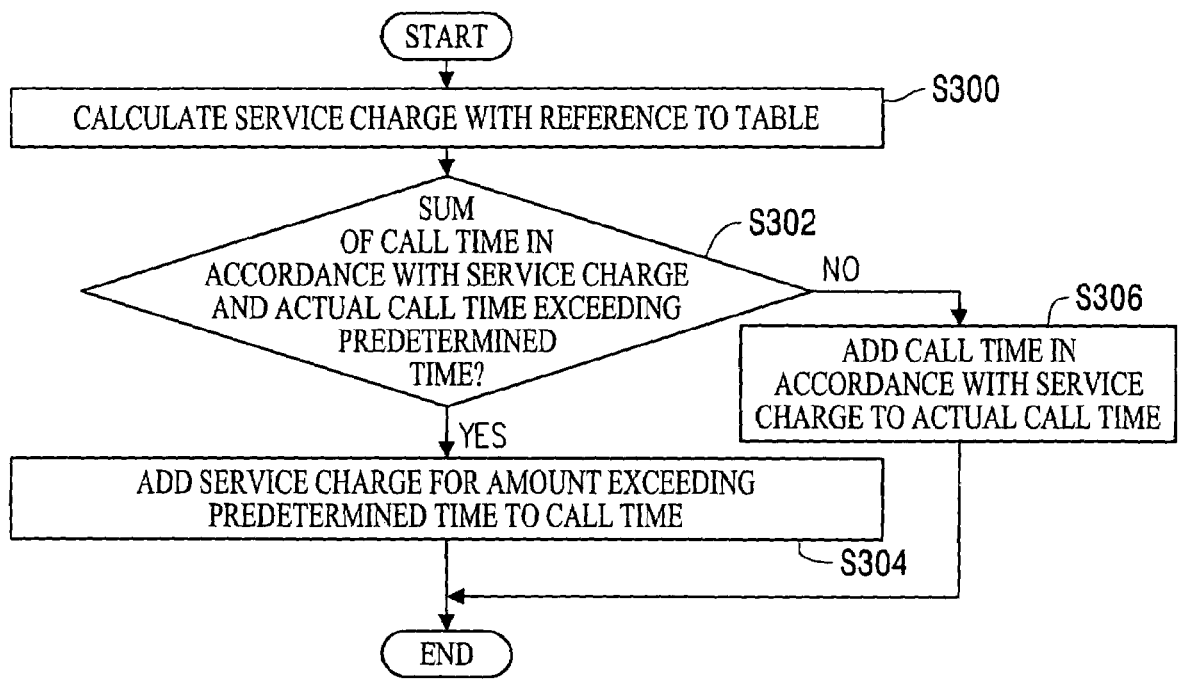
FIG. 7 is a flowchart showing billing processes.

Next, the billing processes in step S228 will be described with reference to FIG. 7. FIG. 7 is a flowchart showing the billing processes.

In the billing processes of step S228, when the call time of the portable terminal 100 exceeds a predetermined time (e.g. 120 minutes), the call charge of the portable terminal 100 (e.g. call charge on a minute basis) is calculated, and with reference to the charge calculation definition table in the storage apparatus 62, service charge in accordance with the result of use by the portable terminal 100 is calculated. The calculated service charge is added to the call charge, and the added total sum is stored as the charge amount to the user of the portable terminal 100. Meanwhile, until the call time of the portable terminal 100 exceeds the predetermined time, the call charge is calculated as a fixed sum; more specifically, the call charge is calculated by the billing processes shown in the flowchart of FIG. 7. The billing processes, when executed in step S228, initially moves to step S300, as shown in FIG. 7.

In step S300, with reference to the charge calculation table in the storage apparatus 62, the service charge in accordance with the result of use by the portable terminal 100 is calculated. The processes then move to step S302, in which it is determined whether or not the sum of the call time in accordance with the calculated service charge and the actual call time of the portable terminal 100 exceeds the predetermined time. If it is determined that it exceeds the predetermined time (Yes), the processes move to step S304.

In step S304, of the call time in accordance with the service charge, with regard to the amount exceeding the predetermined time, the service charge is added to the call charge of the portable terminal 100. The series of processes is then exited. More specifically, if the call time in accordance with the service charge is 20 minutes, and 10 minutes thereof is the amount exceeding the predetermined time, half of the service charge is added to the call charge of the portable terminal 100. If the actual call time of the portable terminal 100 itself exceeds the predetermined time, the entire service charge is added to the call charge of the portable terminal 100.

On the other hand, if it is determined in step S302 that the sum of the call time in accordance with the service charge and the actual call time of the portable terminal 100 does not exceed the predetermined time (No), the processes move to step S306, in which the call time in accordance with the service charge is added to the actual call time of the portable terminal 100. The series of processes is then exited.

Next, the operation of the embodiment will be described.

First, when a legitimate user of the print service provided by the data output control terminal 300 operates the portable terminal 100 he carries, accessing, for example, the WWW server $DS_1$, display data on the WWW server $DS_1$ is displayed on the LCD 44. The description will be made by way of example in relation to a case where the user is to print detailed data of the data displayed on the LCD 44.

In order to print the desired data, the user initially inputs a data print request via the key panel 40.

On the portable terminal 100, when the data print request is input, through steps S100 and S102, the CPU 30 determines the location of the current position by the positioning apparatus 46, displaying on the LCD 44 a request for input of various information associated with printing. The user specifies and inputs, as the various information associated with printing, the URL of the WWW server $DS_1$ which is being browsed. Then, through steps S104 to S108, based on the various information associated with printing which has been input, portable-terminal-position data and print target storage location data are generated as data to be included in the data print request, and the data print request is transmitted to the data output control terminal 300.

On the data output control terminal 300, when the data print request is received, through steps S200 to S204, the CPU 50 obtains the data (the portable-terminal-position data and print target storage location data) included in the received data print request, and performs a search on the print apparatus position data in the storage apparatus 62 based on the obtained portable-terminal-position data, selecting several printing apparatuses PR which are presumably nearest, in terms of distance or time, with reference to the position of the portable terminal 100. If the printing apparatuses $PR_1$ to $PR_5$ are selected, through step S206, printing-apparatus candidate data listing the printing apparatuses $PR_1$ to $PR_5$ is generated, and the generated printing-apparatus candidate data is transmitted to the portable terminal 100.

On the portable terminal 100, when the printing-apparatus candidate data is received, through step S110, based on the received printing-apparatus candidate data, the listed printing apparatuses $PR_1$ to $PR_5$ are displayed on the LCD 44. When the user inputs a selection of the printing apparatus $PR_1$, through steps S112 and S114, a determination signal indicating that the printing apparatus $PR_1$ has been determined is transmitted to the data output control terminal 300.

On the data output control terminal 300, when the determination signal is received, through steps S208 to S211, the print data is obtained from the WWW server $DS_1$ identified by the URL included in the obtained print target storage location data, and the obtained print data is transmitted to a data-format-conversion terminal CS (e.g. the data-format-conversion terminal $CS_1$) which allows conversion of the print data and which corresponds to the determined printing apparatus $PR_1$. As a response thereto, the data which can be printed by the determined printing apparatus $PR_1$ and the preview data are obtained from the data-format-conversion terminal $CS_1$. Through steps S212 to S216, printing-apparatus information regarding the determined printing apparatus $PR_1$ is read from the storage apparatus 62, and the printing-apparatus information which has been read is transmitted to the portable terminal 100. Guide data regarding the determined printing apparatus $PR_1$ is generated, and the generated guide data is transmitted to the portable terminal 100, and preview data is transmitted to the portable terminal 100.

On the portable terminal 100, when the printing-apparatus information, the guide data, and the preview data are received, through steps S116 to S120, based on the received printing-apparatus information, detailed information regarding the printing apparatus PR is displayed on the LCD 44, and based on the received guide data, guide information from the position of the portable terminal 100 to the position where the printing apparatus $PR_1$ is disposed is displayed on the LCD 44, and based on the received preview data, an image of a print by the determined printing apparatus $PR_1$ is displayed on the LCD 44. When the user inputs via the key panel 40 a selection that the image displayed on the LCD 44 is correct for the display data to be printed, through steps S122 to S126, a data print execution request and the authentication data in the ROM 32 are transmitted to the data output control terminal 300.

On the data output control terminal 300, when the data print execution request and the authentication data are received, through steps S218 to S222, the received authentication data and the authentication data in the storage apparatus 62 are compared, and it is determined whether or not they match. Since the user is a legitimate user of the print service provided by the data output control terminal 300, through steps S224 to S234, data which can be printed by the determined printing apparatus $PR_1$ is transmitted to the printing apparatus $PR_1$, and the billing processes are executed.

In the billing processes, if the call time of the portable terminal 100 exceeds the predetermined time, the call charge of the portable terminal 100 is calculated, and with reference to the charge calculation definition table in the storage apparatus 62, the service charge in accordance with the result of use by the portable terminal 100 is calculated. The calculated service charge is added to the call charge, and the added total sum is stored as the charge amount to the user of the portable terminal 100.

Meanwhile, until the call time of the portable terminal 100 exceeds the predetermined time, through step S300, with reference to the charge calculation table in the storage apparatus 62, the service charge in accordance with the result of use by the portable terminal 100 is calculated. If the sum of a call time in accordance with the calculated service charge and the actual call time of the portable terminal 100 exceeds the predetermined time, through steps S302 and S304, with respect to the amount of the call time in accordance with the service charge exceeding the predetermined time, the service charge is added to the call charge of the portable terminal 100. If the sum of the call time in accordance with the service charge and the actual call time of the portable terminal 100 does not exceed the predetermined time, through steps S302 and S306, the call time in accordance with the service charge is added to the actual call time of the portable terminal 100.

When the billing processes are complete, a billing message, a completion message, and a completion signal are transmitted to the portable terminal 100.

On the portable terminal 100, when the billing message, the completion message, and the completion signal are received, through a repetition of steps S128 and S130, the billing message and the completion message are displayed on the LCD 44. Meanwhile, on the printing apparatus PR$_1$, when the data which can be printed by the printing apparatus PR$_1$ is received, printing is executed based on the received data.

When the completion message is displayed, the user visits the store S$_1$ where the printing apparatus PR$_1$ is provided with reference to the guide information displayed on the LCD 44, and receives the data printed by the printing apparatus PR$_1$. The service charge as the price of the print service is charged by being added to the call charge of the portable terminal 100.

The service provider charges with the user the service charge as the price of the print service, added to the call charge, thereby obtaining the price of the service.

If the user inputs, as the various information associated with printing, a desired service area which is the approximate location where the service of output data is desired, desired service area data indicating the desired service area is transmitted to the data output control terminal 300. On the data output control terminal 300, a search is performed on the printing apparatus position data in the storage apparatus 62 based on the obtained desired service area data, selecting all the printing apparatuses PR in the area identified by the desired service area data.

For example, if the user inputs "Shibuya" as the desired service area, on the portable terminal 100, all the printing apparatuses PR provided in the proximity of Shibuya are displayed on the LCD 44.

If the user inputs the print specifications of the printing apparatus PR as the various information associated with printing, print specification data indicating the print specifications is transmitted to the data output control terminal 300. On the data output control terminal 300, a search is performed on the print specification data in the storage apparatus 62 based on the obtained print specification data, selecting all the printing apparatuses PR which comply with the print specification data.

For example, if the user inputs "color" as the print specifications, on the portable terminal 100, all the printing apparatuses which allow printing of data in color are displayed on the LCD 44.

If the user inputs data format as the various information associated with printing, print format data indicating the data format is transmitted to the data output control terminal 300. On the data output control terminal 300, a search is performed on the print format data in the storage apparatus 62 based on the obtained print format data, selecting all the printing apparatuses PR which comply with the print format data.

For example, if the user inputs "HTML format" as the data format, on the portable terminal 100, all the printing apparatuses PR corresponding to a data-format-conversion terminal CS which allows conversion of data in HTML format are displayed on the LCD 44.

If the user inputs a printing apparatus ID of the printing apparatus PR as the various information associated with printing in order to directly specify the printing apparatus PR, printing-apparatus identification data indicating the printing apparatus ID is transmitted to the data output control terminal 300. On the data output control terminal 300, a search is performed on the printing apparatus data in the storage apparatus 62 based on the obtained printing-apparatus identification data, selecting the printing apparatus PR corresponding to the printing-apparatus identification data.

For example, if the user inputs "0001" as the printing apparatus ID, on the portable terminal 100, a printing apparatus PR whose printing apparatus ID is "0001" is displayed on the LCD 44. If a printing apparatus PR whose printing apparatus ID is "0001" does not exist, no printing apparatus PR is displayed.

If the user inputs the desired service area, the print specifications, and the data format compositely as the various information associated with printing, data indicating them is transmitted to the data output control terminal 300. On the data output control terminal 300, a search is performed based on the obtained plurality of data, and selecting all the printing apparatuses PR in accordance therewith.

For example, if the user inputs "Shibuya", "color", and "HTML format" as the desired service area, the print specifications, and the data format, on the portable terminal 100, of the printing apparatuses PR corresponding to the data-format-conversion terminal CS which allows conversion of data in HTML format, all the printing apparatuses provided in the proximity of Shibuya and which allow printing of data in color are displayed on the LCD 44.

If the user is not a legitimate user of the print service provided by the data output control terminal 300, when the image is displayed on the LCD 44, even if a selection that the printing data to be printed is actually the image displayed on the LCD 44 is input via the key panel 40, the desired data is not printed by the printing apparatus PR$_1$.

As described above, in this embodiment, the data output control terminal 300, with reference to the charge calculation definition table which define service charge in accordance with the result of use by the portable terminal 100 as the price of the print service, calculates the service charge in accordance with the result of use by the portable terminal 100 and adds the calculated service charge to the call charge of the portable terminal 100.

Thus, the service charge as the price of the print service can be specifically calculated, and the service charge need not be calculated each time the print service is received. Furthermore, compared with the arrangement in which a counter which counts the number of prints is provided in the printing apparatus PR so that the number of prints is counted, the counter need not be provided in each of the printing apparatuses PR, serving to reduce the cost for settling the service charge. Furthermore, even if the user does not carry enough money with him, the user is allowed to receive the output data.

Accordingly, the user is allowed to receive the output data more easily, readily obtaining detailed information on the Internet 400 and paying the service charge with ease. The service provider receives benefits with respect to cost, readily and securely collecting the service charge and facilitating the procedure to settle the service charge. In addition, the service provider is allowed to specifically notify the user of the service charge, thus providing information service with adequate satisfaction.

Furthermore, in the embodiment, the data output control terminal 300 compares the authentication data received from the portable terminal 100 and the authentication data in the storage apparatus 62, and if they match, executes output of data to the printing apparatus PR and the billing processes.

Thus, the print service is provided only to legitimate users of the print service provided by the portable terminal 100, inhibiting illegitimate use by illegitimate users of the print service provided by the data output control terminal 300. Also, the service provider is allowed to bill the service charge to a specific person, more readily and securely collecting the service charge and facilitating the procedure of settling the service charge, thus providing an even more satisfactory information service.

Furthermore, in the embodiment, the data output control terminal 300 transmits a billing message to the portable terminal 100, which indicates the service charge calculated by the billing processes.

Thus, the user enjoys the convenience of knowing the amount of use of the print service. Accordingly, the service provider is allowed to provide to the user an even more satisfactory information service.

Furthermore, in the embodiment, until the sum of the call time in accordance with the service charge and the actual call time of the portable terminal 100 exceeds a predetermined time, the data output control terminal 300 does not add the service charge to the call charge while adding the call time in accordance with the service charge to the actual call time.

Thus, until the sum of the call time in accordance with the service charge and the actual call time of the portable terminal 100 exceeds the predetermined time, the user is charged with only a fixed sum, saving payment of the service charge when the actual call time of the portable terminal 100 does not exceed the predetermined time. Accordingly, the service provider is allowed to provide to the user an even more satisfactory information service.

Furthermore, in the embodiment, the data output control terminal 300 obtains data associated with a data print request from a WWW server DS, selects one of a plurality of printing apparatuses PR, and outputs the obtained data to the selected printing apparatus PR.

Thus, compared with the conventional art, detailed information on the Internet 400 can be readily obtained, and when the detailed information is printed, the data output control terminal 300 processes print data and data which can be printed by the printing apparatus PR, eliminating the need for an expanded memory on the portable terminal 100 and reducing the processing load of the portable terminal 100. Furthermore, since the portable terminal 100 need not read data, the communications time is reduced, thus reducing the time required for receiving output data. Accordingly, the service provider is allowed to provide to the user an even more satisfactory information service, and a print service with a comfortable printing environment which is independent of the functionality of the portable terminal 100.

Furthermore, in the embodiment, the data output control terminal 300 selects one of a plurality of printing apparatuses PR based on portable-terminal-position data that identifies the position of the portable terminal 100.

Thus, data is printed by a printing apparatus PR in relation to the position of the portable terminal 100. Thus, for example, by selecting a printing apparatus PR which is presumably nearest, in terms of distance or time, with reference to the position of the portable terminal 100, the user is allowed to receive output data more easily, obtaining detailed information on the Internet 400 even more easily. Accordingly, the service provider is allowed to provide to the user an even more satisfactory information service.

Furthermore, in the embodiment, the data output control terminal 300 obtains data from a WWW server identified by a URL included in a data print request.

Thus, detailed information on any WWW server DS connected to the Internet 400 is allowed to be obtained. Accordingly, the service provider is allowed to provide to the user an even more satisfactory information service.

Furthermore, in the embodiment, the data output control terminal 300 obtains from a WWW server DS print data as data associated with a data print request.

Thus, rough information is displayed on the portable terminal 100 and detailed information is printed by the printing apparatus PR, thus allowing the portable terminal 100 to obtain detailed information on the Internet 400 while achieving a comfortable display processing. Accordingly, the service provider is allowed to provide to the user an even more satisfactory information service, and a print service with an even more comfortable printing environment.

Furthermore, in the embodiment, the data output control terminal 300 transmits preview data generated by a data-format-conversion terminal CS, and when a data print execution request from the portable terminal 100 is received as a response to the output of the preview data, it outputs data associated with the data print request to a printing apparatus PR.

Thus, by notifying the user of the preview data prior to the service of output data, the user is prevented from printing wrong data. Accordingly, the service provider is allowed to provide to the user an even more satisfactory information service.

Furthermore, in the embodiment, the data output control terminal 300 outputs to a printing apparatus PR data converted in a data-format-conversion terminal CS.

Thus, even if a printing apparatus PR is newly provided, the service provider needs to change setting of data-format-conversion terminals CS or only in relation to the new printing apparatus PR, allowing use of the new printing apparatus PR without any change of setting on the user's side. Accordingly, the service provider is allowed to readily make setting when a printing apparatus is newly provided, and furthermore, the service provider is allowed to provide to the user an even more satisfactory information service.

Furthermore, in the embodiment, the data output control terminal 300 transmits to the portable terminal 100 guide data indicating guide information to guide the user from the position of the portable terminal 100 to the position where the determined printing apparatus PR is provided.

Thus, the user is allowed to visit, according to the guide information, the position where the printing apparatus PR is provided, thus obtaining output data relatively securely. Accordingly, the service provider is allowed to provide to the user an even more satisfactory information service.

Furthermore, in the embodiment, with regard to the data-format-conversion terminals $CS_1$ to $CS_I$, one or more of the data-format-conversion terminals $CS_1$ to $CS_I$ is selected, so that the data-format-conversion processes are executed on the selected data-format-conversion terminals CS.

Thus, because the data-format-conversion processes are executed on data-format-conversion terminals CS with which the transmission load of the Internet 400 or the processing load is low, irrespective of the transmission load of the Internet 400 or the processing load of the data-format-conversion terminals CS, the time required for receiving the service of output data is substantially constant. Accordingly, the service provider is allowed to provide to the user a print service with an even more comfortable printing environment.

In the above-described embodiment, the printing apparatus corresponds to the output terminal, the storage apparatus 62 corresponds to the storage device, step S204 corresponds to the selecting device, step S228 corresponds to the billing device, step S222 corresponds to the comparison device, step S226 corresponds to the comparison device, and step S230 corresponds to the output device.

Also, in the above-described embodiment, the printing apparatus PR corresponds to the output terminal, the storage apparatus 62 corresponds to the storage device, step S204 corresponds to the selecting device, step S228 corresponds to the billing device, step S222 corresponds to the comparison device, step S226 corresponds to the comparison device, and step S230 corresponds to the output device.

In the above-described embodiment, the arrangement is such that as printing apparatuses PR which are presumably the most suitable for the user of the portable terminal 100 to receive the service of output data, printing apparatuses PR which are presumably nearest, in terms of distance or time, with reference to the position of the portable terminal, printing apparatuses PR in an area identified by desired service area data, printing apparatuses PR which comply with print format data, printing apparatuses PR which comply with print specification data, or a printing apparatus PR corresponding to printing-apparatus identification data are selected; however, without limitation thereto, in addition, for example, printing apparatuses PR which presumably allow the user to receive the service of output data quickest in time with considerations to the output rates of the printing apparatuses PR, or printing apparatuses PR which provide the service of output data at the cheapest price may be selected.

In the former arrangement, because data associated with a data print request is printed by a printing apparatus PR which presumably allows the user to receive the service of output data quickest in time, the user receives the service of output data in accordance with his purpose, thus being allowed to readily obtain detailed information on the Internet 400.

In the latter arrangement, because data associated with a data print request is printed by a printing apparatus PR which provides the service of output data at the cheapest price, the user is allowed to receive the service of output data in accordance with his purpose, thus being allowed to readily obtain detailed information on the Internet 400. Accordingly, the service provider is allowed to provide to the user an even more satisfactory information service.

Furthermore, in the above-described embodiment, the arrangement is such that the printing apparatuses $PR_1$ to $PR_n$ that print data are provided, data associated with a data print request from the portable terminal 100 being printed by one of the printing apparatuses PR; however, without limitation thereto, for example, the arrangement may be such that output apparatuses which displays data or outputs data as sound, etc. are provided, data associated with a data output request from the portable terminal 100 being output by one of the output apparatuses.

Furthermore, in the above-described embodiment, the arrangement is such that preview data is generated by the data-format-conversion terminals CS; however, without limitation thereto, the arrangement may be such that the preview data is generated by the data output control terminal 300.

Furthermore, in the above-described embodiment, with regard to the data-format-conversion terminals $CS_1$ to $CS_j$, the arrangement is such that one or more of the data-format-conversion terminals $CS_1$ to $CS_j$ is selected in accordance with the transmission load of the Internet 400 or the processing load of the data-format-conversion terminals CS, the data-format-conversion processes being executed by the selected data-format-conversion terminals CS; however, without limitation thereto, the arrangement may be such that the data-format-conversion processes are executed by a specific data-format-conversion terminal.

Furthermore, in the above-described embodiment, the arrangement is such that the processes shown in the flowcharts of FIG. 4, FIG. 6, and FIG. 7 are executed by a specific data output control terminal 300; however, without limitation thereto, the arrangement may be such that, similarly to the data-format-conversion terminals $CS_1$ to $CS_j$, a plurality of data output control terminals is provided, and one of the plurality of data output control terminals is selected in accordance with the transmission load of the Internet 400 or the processing load of the data output control terminals, the processes being executed by the selected data output control terminal.

In accordance with the arrangement, because the processes shown in the flowcharts of FIG. 4, FIG. 6, and FIG. 7 are executed by a data output control terminal with which the transmission load of the Internet 400 or the processing load is low, irrespective of the transmission load of the Internet 400 or the processing load of the data output control terminals, the time required to receive the service of output data is substantially constant. Accordingly, the service provider is allowed to provide to the user a printing service with an even more comfortable printing environment.

Furthermore, in the above-described embodiment, the description deals with a case in which a data output control apparatus according to the present invention is applied with the internet 400; however, without limitation thereto, it may be applied with networks other than the internet 400.

Furthermore, in the above-described embodiment, the portable terminal 100, the data-format-conversion terminals $CS_1$ to $CS_j$, the www servers $DS_1$ to $DS_m$, the printing apparatuses $PR_1$ to $PR_n$, and the data output control terminal 300 are connected via the same network; however, without limitation thereto, the data output control terminal 300 and the portable terminal 100, the data output control terminal 300 and the data-format-conversion terminals $CS_1$ to $CS_j$, the data output control terminal 300 and the www servers $DS_1$ to $DS_m$, and the data output control terminal 300 and the printing apparatuses $PR_1$ to $PR_n$ may be respectively connected via different networks.

Furthermore, in the above-described embodiment, the description deals with a case where the processes shown in the flowcharts of FIG. 4, FIG. 6, and FIG. 7 are executed by executing the control programs stored, in advance, in the ROMs 32 and 52; however, without limitation thereto, the programs to be executed may be read into the rams 34 and 54 from a storage medium storing the programs showing the procedures.

The storage medium is a semiconductor storage medium such as a RAM or ROM, a storage medium of the magnetic storage type, such as an FD or an HD, a storage medium of the optical reading type, such as a CD, a CDV, an LD, and a DVD, or a storage medium of the magnetic storage type/optical reading type, such as an MO, and includes any storage medium which is computer readable, irrespective of the reading method such as electronic, magnetic, and optical.

Furthermore, in the above-described embodiment, a data output control apparatus according to the present invention is applied to a case where, as shown in FIG. 2, by the data output control terminal 300, the service provider provides the service of, in response to a data print request from a user, obtaining data associated with the data print request from one of the WWW

What is claimed is:

1. A data output control apparatus which is communicatively connected, via a network, to a portable terminal which is a portable communications device, carried by a user, that issues a data print request, and to a plurality of output terminals, disposed at various locations, that print data, and which outputs, in response to the data print request from said portable terminal, data associated with the data print request to said output terminals, the data output control apparatus comprising:

a memory storing a charge calculation table;
a computer processor configured:
(1) to select one of the plurality of output terminals, and
(2) to execute billing in accordance with a result of use by the portable terminal of a print service provided by the data output control apparatus, including: (i) calculating a service charge in accordance with the result of use by the portable terminal according to the charge calculation definition table stored in the memory which defines the service charge as the price of the print service with regard to the result of use by the portable terminal, and (ii) adding the calculated service charge to a communications charge of the portable terminal; and
a communications interface that outputs the data associated with the data print request to the output terminal selected by the computer processor.

2. The data output control apparatus according to claim 1, further comprising:
the memory storing, for each user of said portable terminal, authentication data to determine whether or not the user is a legitimate user of said print service,
the computer processor further configured (3) to compare authentication data received from said portable terminal and the authentication data in the memory, the computer processor compares the authentication data received from said portable terminal and the authentication data in said memory, and if they satisfy a predetermined relationship, permits an output by said communications interface and execution of the billing.

3. The data output control apparatus according to claim 1, said communications interface outputs billing data, indicating the result of the billing, to said portable terminal.

4. The data output control apparatus according to claim 1, wherein said communications charge is calculated as a fixed charge until the communications time of said portable terminal exceeds a predetermined time, until the sum of a communications time in accordance with said service charge and the actual communications time of said portable terminal exceeds said predetermined time, and
during execution of the billing, the computer processor does not add said service charge to said communications charge while adding the communications time in accordance with said service charge to said actual communications time.

5. A data output control apparatus which is communicatively connected, via a network, to a portable terminal which is a portable communications device, carried by a user, that issues a data output request, and to a plurality of output terminals, disposed at various locations, that output data, and which outputs, in response to the data output request from said portable terminal, data associated with the data output request to said output terminals, the data output control apparatus comprising:

a memory storing a charge calculation table;
a computer processor configured:
(1) to select one of said plurality of output terminals, and
(2) to execute billing in accordance with a result of use by said portable terminal of an output service provided by said apparatus, including: (i) calculating a service charge in accordance with the result of use by said portable terminal according to the charge calculation definition table stored in the memory which defines the service charge as the price of the output service with regard to the result of use by the portable terminal, and (ii) adding the calculated service charge to a communications charge of said portable terminal; and
a communications interface that outputs the data associated with the data output request to the output terminal selected by the computer processor.

6. The data output control apparatus according to claim 5, further comprising:
the memory storing, for each user of said portable terminal, authentication data to determine whether or not the user is a legitimate user of said output service,
the computer process further configured (3) to compare authentication data received from said portable terminal and the authentication data in the memory, the computer processor compares the authentication data received from said portable terminal and the authentication data in the memory, and if they satisfy a predetermined relationship, permits an output by the communications interface and execution of the billing.

7. The data output control apparatus according to claim 5, the communications interface outputs billing data, indicating the result of the billing, to said portable terminal.

8. The data output control apparatus according to claim 5, wherein said communications charge is calculated as a fixed charge until the communications time of said portable terminal exceeds a predetermined time, until the sum of a communications time in accordance with said service charge and the actual communications time of said portable terminal exceeds said predetermined time, and
the computer processor does not add said service charge to said communications charge while adding the communications time in accordance with said service charge to said actual communications time.

9. The data output control apparatus according to claim 2, the communications interface outputs billing data, indicating the result of the billing, to said portable terminal.

10. The data output control apparatus according to claim 2, wherein said communications charge is calculated as a fixed charge until the communications time of said portable terminal exceeds a predetermined time, until the sum of a communications time in accordance with said service charge and the actual communications time of said portable terminal exceeds said predetermined time, and
the computer processor does not add said service charge to said communications charge while adding the communications time in accordance with said service charge to said actual communications time.

11. The data output control apparatus according to claim 3, wherein said communications charge is calculated as a fixed charge until the communications time of said portable terminal exceeds a predetermined time, until the sum of a communications time in accordance with said service charge and the actual communications time of said portable terminal exceeds said predetermined time and
the computer processor does not add said service charge to said communications charge while adding the communications time in accordance with said service charge to said actual communications time.

12. The data output control apparatus according to claim 6, the communications interface outputs billing data, indicating the result of the billing, to said portable terminal.

13. The data output control apparatus according to claim 6,
wherein said communications charge is calculated as a fixed charge until the communications time of said portable terminal exceeds a predetermined time, until the sum of a communications time in accordance with said service charge and the actual communications time of said portable terminal exceeds said predetermined time, and
the computer processor does not add said service charge to said communications charge while adding the communications time in accordance with said service charge to said actual communications time.

14. The data output control apparatus according to claim 7,
wherein said communications charge is calculated as a fixed charge until the communications time of said portable terminal exceeds a predetermined time, until the sum of a communications time in accordance with said service charge and the actual communications time of said portable terminal exceeds said predetermined time and
the computer processor does not add said service charge to said communications charge while adding the communications time in accordance with said service charge to said actual communications time.

* * * * *